US012165486B1

(12) United States Patent
Brownstein

(10) Patent No.: US 12,165,486 B1
(45) Date of Patent: Dec. 10, 2024

(54) PEDIATRIC VEHICULAR HEATSTROKE CHILD SAFETY SYSTEM

(71) Applicant: Robert Brownstein, Santa Cruz, CA (US)

(72) Inventor: Robert Brownstein, Santa Cruz, CA (US)

( * ) Notice: Subject to any disclaimer, the term of this patent is extended or adjusted under 35 U.S.C. 154(b) by 0 days.

(21) Appl. No.: 18/637,368

(22) Filed: Apr. 16, 2024

(51) Int. Cl.
*G08B 21/02* (2006.01)

(52) U.S. Cl.
CPC .................................... *G08B 21/02* (2013.01)

(58) Field of Classification Search
CPC ...................................................... G08B 21/02
See application file for complete search history.

(56) References Cited

U.S. PATENT DOCUMENTS 8,560,164 B2 * 10/2013 Nielsen ............ G06Q 10/06311 340/576
11,941,896 B1 * 3/2024 Drake .................... G08B 21/24
2020/0398637 A1 * 12/2020 Chang .................... B60N 2/003
2021/0247828 A1 * 8/2021 Gage ..................... G06F 1/3287
2022/0325879 A1 * 10/2022 Selevan ............... H05B 47/105

* cited by examiner

*Primary Examiner* — Travis R Hunnings
(74) *Attorney, Agent, or Firm* — Robert Brownstein

(57) ABSTRACT

The invention is a vehicular safety system that can detect the presence or absence of a child and a driver. Where it detects a child present/driver absent status, it concludes a child is unattended and initiates an escalating series of alarms.

13 Claims, 11 Drawing Sheets

501

PEDIATRIC VEHICULAR HEATSTROKE CHILD SAFETY SYSTEM

TECHNICAL FIELD

This invention is a system for avoiding pediatric vehicular heatstroke of children left unattended inside a heating-up vehicle.

BACKGROUND OF INVENTION

Over the last 25 years in the US almost 950 children have perished due to Pediatric Vehicular Heatstroke (PVH) as a result of being left unattended, or becoming trapped, inside heating-up cars. To date, available systems for detecting unattended children in cars essentially rely on weight sensors in child seats. Such systems do not detect children who are not seated in those seats. Most such systems may invoke an alarm condition that is single-level and local, such as sound or light warnings. Unless someone responds, however, the PVH-potential situation persists.

Statistically, a high number of PVH fatalities occur with infants left unattended. These are non-ambulatory children left in carriers in the vehicle. A parent is distracted and forgets the infant secured in a rear seat. By the time the parent remembers, in many cases, the vehicle's interior has heated up to a temperature that precipitates PVH onset and subsequent organ failure.

Another situation occurs when a child gets into a vehicle that is parked, outdoors, unbeknownst to the parents. It may be a case of a car left unlocked in a driveway where a child gets in and the door closes afterward.

What would help significantly reduce PVH injury and death is a system that can detect a child's unattended presence in a vehicle. The system should be operative to first create a localized alarm, and if not responded to, initiate a higher-level response that is likely to result in timely emergency response.

BRIEF DESCRIPTION OF INVENTION

The invention herein disclosed comprises two subsystems. A first subsystem is affixed to a vehicle's ceiling, midway between front and back, and midway between the sides. It is operative to detect the presence of a child (e.g. any moving and/or breathing child), and to detect whether a driver is in driving position. If the system detects an unattended child, it initiates a local response of audible, repeated, warning sounds by triggering an under-hood second subsystem. After a predetermined time has elapsed, the first subsystem ceases the local response and initiates a higher-level response alerting emergency services to the vehicle's description, current location, and situation.

The subsystem inside the vehicle is self-contained. It has its own battery for power and communicates with the second subsystem using wireless signal conveyance. The under-hood subsystem is connected to the vehicle's battery and is operative to receive wireless signals from the first subsystem and emit audible warning sounds.

While the audible-sound alarm is occurring, if a child is removed from the vehicle, or a driver enters and is in driving position, the first subsystem will detect either condition and cease the alarm response. After a predetermined time has elapsed, if a child's presence continues, and no driver is detected in driving position, the first unit will cease the audible-noise response and place a cellular call to emergency services. When that call is taken, the first subsystem conveys a text/voice message comprising vehicle description, vehicle location coordinates, and short description of the emergency situation. After the call is completed, the first subsystem resumes, periodically, the audible-sound alarm until no child is detected in the vehicle, or the system is reset by the driver.

DETAILED DESCRIPTION OF INVENTION

Figure 1:
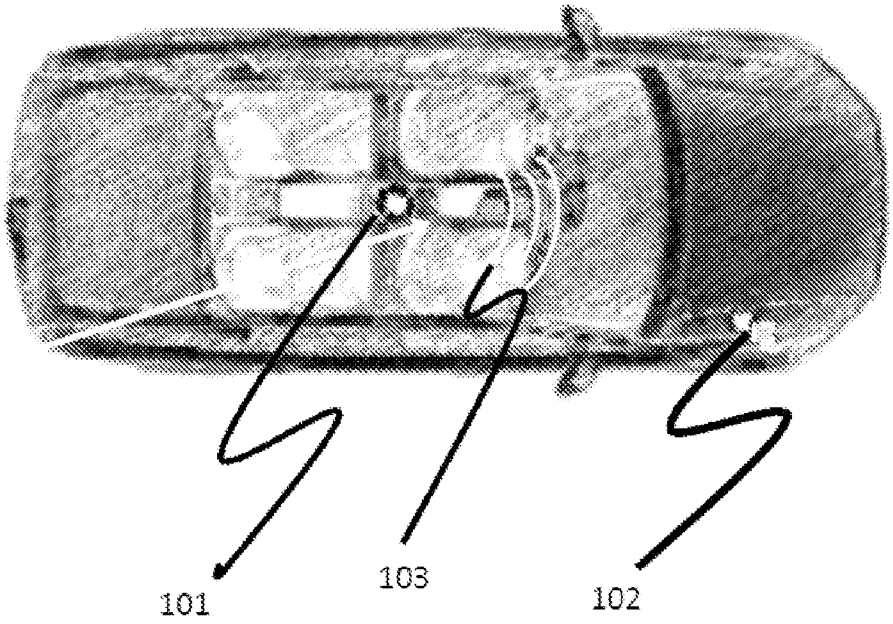
FIG. 1 shows a vehicle interior, from top-down view, showing one embodiment of unit 1 and unit 2 subsystems and their placement.

Over the last 25 years, just in the United States, nearly 1,000 children have died from pediatric vehicular heatstroke (PVH). There are no statistics for the children who survived death but suffered injury when heatstroke kicked in and organ failure began to progress. It is believed to be far greater than the number of PVH fatalities.

On a sunny day, with an outside temperature of 70 to 75 degrees, a car with windows closed, in direct sunlight, can increase in temperature to more than 110 degrees within 30 minutes. Heatstroke begins to take place well before that. Even a partially opened car window, on a windless day, will not prevent a car from heating up to heatstroke-inducing temperatures.

To prevent a child left unattended in a vehicle, a safety system must be able to detect the child's presence inside the vehicle. The system then needs to determine if a driver is in driving position. If a child is present but driver absent, the system concludes that the child is unattended.

The child present/driver absent condition first triggers an immediate localized response. A sound loud enough to hear up to, say, 50-100 feet, and repeated every half (0.5) second, should get the attention of a driver who has left the vehicle with a child still inside. And, a timer is started with a predetermined time-duration limit. The driver returning in response to that first alarm could then end the alarm by either removing the child, or returning to driving position. In either case, the system would conclude that either child absent/driver present condition exists and reset the alarm response.

However, in the event that the system detects child present/driver absent, the system will continue the first response (e.g. audible sound) while the timer continues to measure time duration. If the child present/driver absent state is unchanged when the timer reaches its predetermined duration limit, the system will cease the first response sound and initiate a higher-level response.

The higher-level response comprises having prepared a text/voice message with car description, current location, and brief situation description. This would take only seconds. Then, the system places a call to an emergency services number (e.g. 911). When the call is picked up, the message is conveyed in both text and voice format, and repeats until the call is concluded.

Once the call has been placed, the system reverts to periodic first-response action until a child absent/driver present condition is detected. The driver will have been prompted, beforehand, to call the emergency services number and cancel the request, if the driver returns after the higher-level alert has been initiated.

In a case where the driver fails to return and emergency services arrives and removes the child, the system will detect a child absent condition and revert to active mode of continued surveillance and no alarm.

The following description and supporting drawings are included for greater detail and system understanding. The drawings and examples are exemplary embodiments and should not be read as limiting the scope of claims.

FIG. 1 is a top-down view, inside a vehicle showing the position of unit 1 (101) subsystem inside the vehicle, and unit 2 (102) subsystem in the engine compartment. Unit 1 and unit 2 subsystems communicate with one another using wireless conveyance (103).

Figure 2:
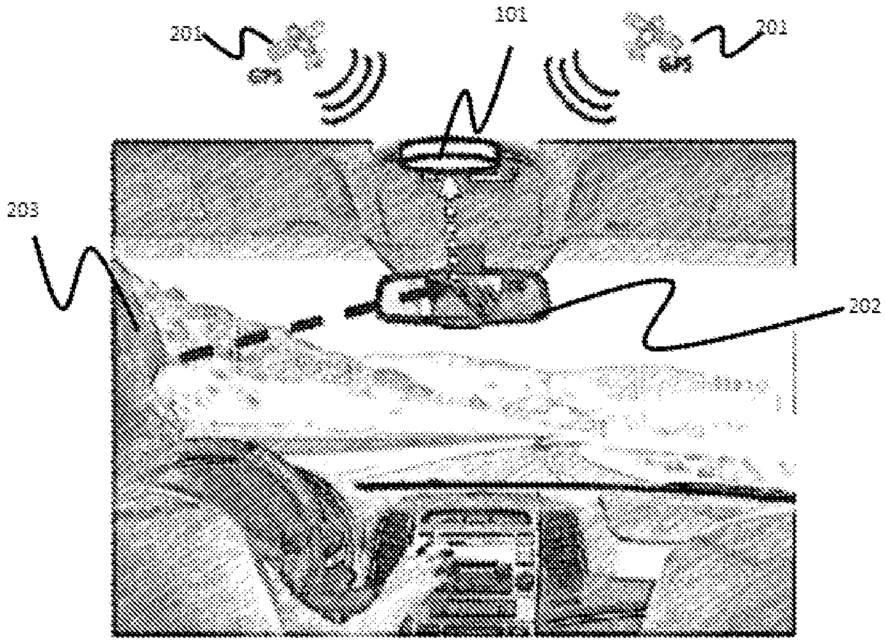
FIG. 2 shows a vehicle interior view from back to front illustrating unit 1 receiving GPS signals and driver's reflection in rear-view mirror.

FIG. 2 is a view from the backseat area of a vehicle, looking toward the windshield, showing unit 1 (101) affixed to the vehicle ceiling, and receiving GPS signals (201) and capturing the image of a driver (203) as reflected in the rearview mirror (202). The GPS provides the current vehicle location information, and the driver-in-driving-position indicates a driver-present condition.

Figure 3:
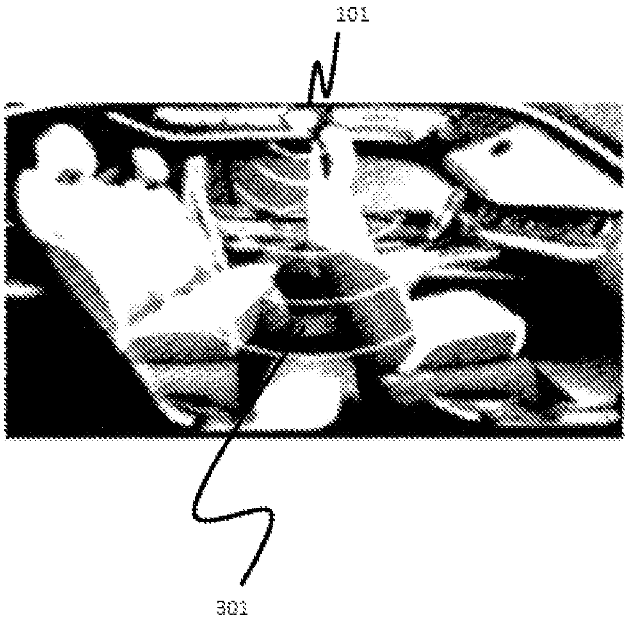
FIG. 3 shows a vehicle interior view from side showing unit 1 sensing motion and $CO_2$ levels.

FIG. 3 shows the unit 1 (101) using sensors to detect motion and $CO_2$ levels inside the vehicle (301). Sensing motion and breathing would indicate the presence of a child or a pet. This would be noted as a child-present condition. The combination of driver present/absent and child present/absent are used by the system to determine if a child is unattended (e.g. child present/driver absent).

Figure 4:
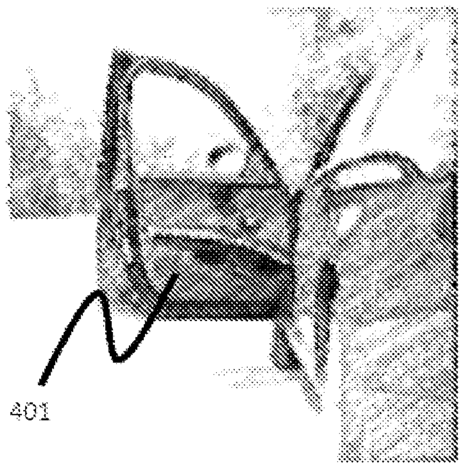
FIG. 4 shows a vehicle door open which would cause unit 1 to change state from standby to active mode.

FIG. 4 shows a vehicle with door open (401). The system ordinarily is in a standby state whereby it uses minimal battery power and only motion-detection sensing except during brief, periodic, self-testing whereupon the unit 1 subsystem temporarily reverts to active mode. A door opening would be a motion detection that would cause the system to change state from standby to active mode wherein all subsystems become fully operational.

Figure 5:
FIG. 5 shows a child in child seat which would be sensed as child-in-car.

As shown in FIG. 5, if a child (501) were placed in the vehicle, into a car seat, the door-opening motion detection would have the system in active mode, and it would determine the child's presence through further motion detection and breathing detection. If the system did not detect a driver in the driver seat, it would sense the condition as child present/driver absent, and after a predetermined delay to allow the driver to move to driving position, would initiate a first alarm response. If, however, after the child is placed in his/her seat, and the driver is detected in driving position, the system would detect child present/driver present and remain in active mode but invoke no alarm actions.

Figure 6:
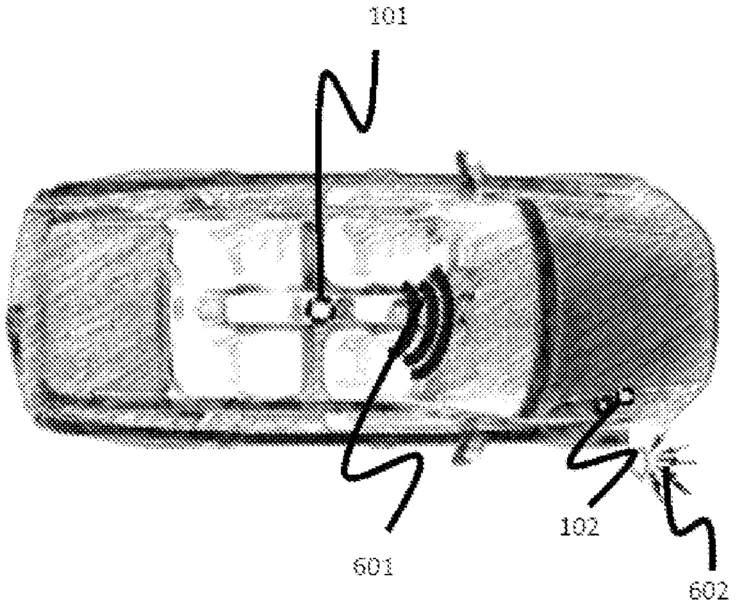
FIG. 6 illustrates a first-level response to child present/driver absent detection wherein unit 1 sends wireless pulses to unit 2 which converts pulses to audible warning sounds.
Figure 7:
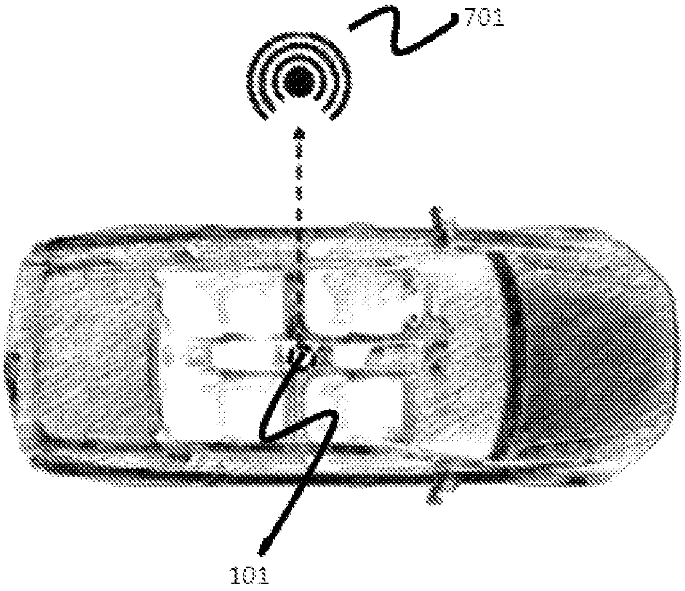
FIG. 7 illustrates a higher-level response to child present/driver absent detection after a predetermined time has elapsed. Audible sound ceases and unit 1 makes call to emergency services.

FIG. 6 shows the case where the system has detected child present/driver absent. It may be the case that the child entered the parked vehicle, alone; or the child was placed in his/her seat while the driver has just closed the door and begins to walk away to do a quick chore. Before a driver can walk more than a few steps, the system will have invoked the first alarm response. If the child had entered the car, alone, and the door was closed, the system would sense child present/driver absent and invoke the first alarm response.

In nearly all cases, the first level alarm response should resolve the situation without further alarm escalation. A driver returning to the driving position, or removing the child from the vehicle, would quickly put the system in either child present/driver present or child absent/driver absent condition, and that would prompt the system to cease alarm activity. However, in the case where the child entered the car, alone, and was trapped inside, or the driver left the child unattended and did not respond to the first alarm, a timer that was set when the first alarm response was initiated may time out with no change in child present/driver absent state. At that time, the system stops the first alarm response and elevates the response to a higher-level response. The system prepares a text/voice message with vehicle description, location, and situation. Then, the system makes a call to emergency services, and upon pickup, conveys the message repeatedly until the call is ended by emergency services hanging up. At that point, the system reverts to a periodic first alarm response until the child present/driver absent condition is ended.

Figure 8:
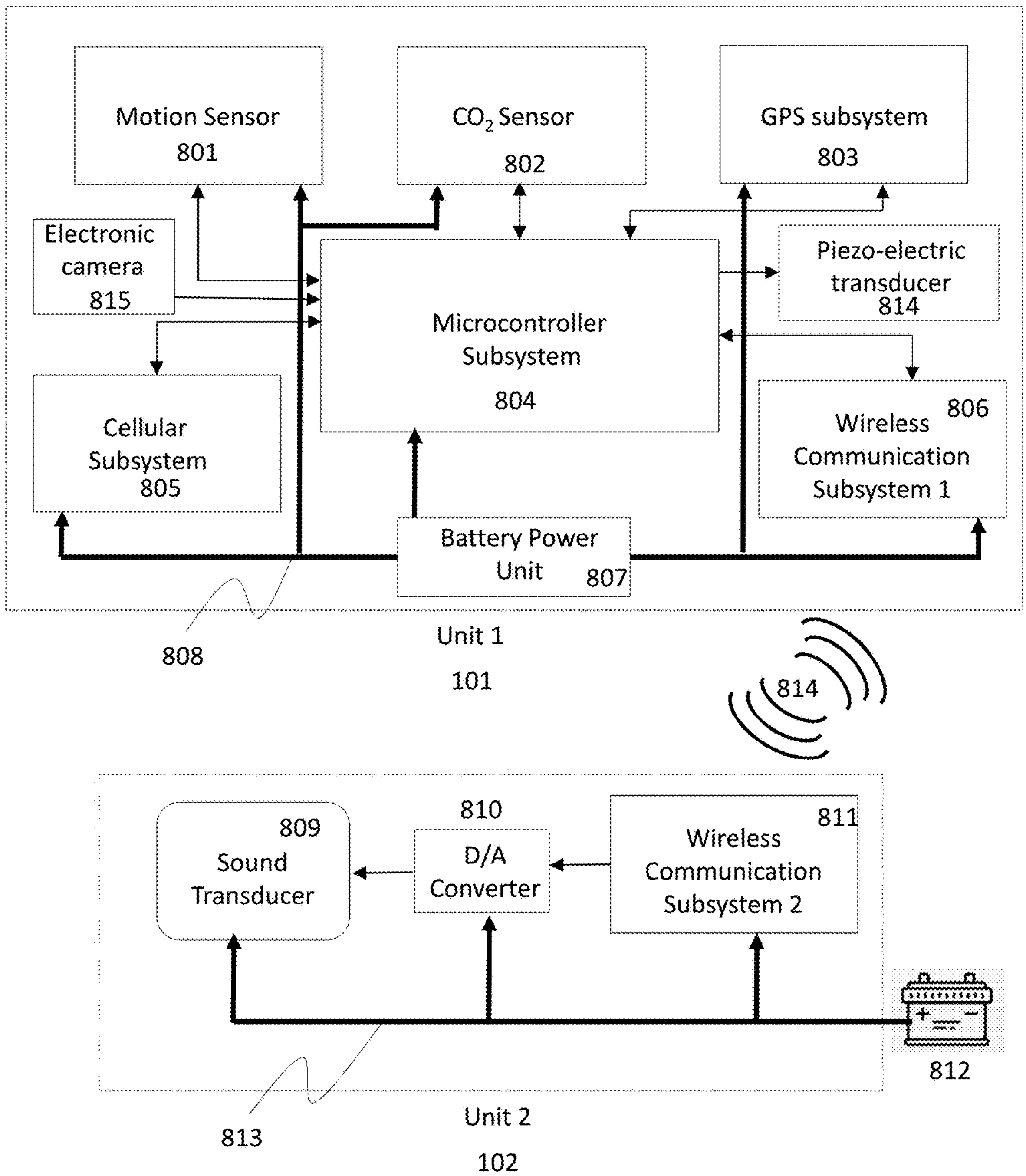
FIG. 8 shows an embodiment of unit 1 and unit 2 subsystems.

FIG. 8 shows an embodiment of the system comprising a unit 1 (101) and unit 2 (102). As shown, unit 1 comprises a motion sensor (801), a $CO_2$ sensor (802), a GPS subsystem (803) a microcontroller (804), a cellular subsystem (805), a first wireless communications subsystem (806), a battery-powered unit (807), a power bus (808), a piezo-electric transducer (814) and electronic camera (815). As shown unit 2 comprises a sound transducer (809), a digital-to-analog converter (810) and a second wireless communications subsystem (811). Unit 2 is powered by a vehicle's battery (812) as distributed over a power bus (813). Units 1 and 2 communicate wirelessly. A first alarm response, for example, would have unit 1 transmitting wireless pulses to unit 2, and unit 2 converting the digital pulses to analog signals used to excite the sound transducer.

In operation, the motion and $CO_2$ sensors detect motion and breathing, respectively, to determine child present or absent status. The electronic camera, using rearview mirror reflection, determines driver present or absent status. The GPS subsystem receives GPS satellite signals to determine current vehicle location. The wireless communications subsystem 1 is used to convey first-level alarm pulses to unit 2's wireless communications subsystem 2. The cellular subsystem is used during the higher-level alarm response to call emergency services and convey the text/voice message containing vehicle description, location and situational description. The microcontroller, a highly-integrated controller, comprises central processor, RAM memory, program memory, input-output, and timer functions. At least one program is stored in non-volatile program memory in the microcontroller. That program controls sensing, status determination, duration timing, and alarm responses. The unit 2 serves to receive first-level response pulses from unit 1, conveyed wirelessly, and to respond to each pulse by triggering an audible noise pulse on its sound transducer. A repetition rate of 0.5 seconds could be a nominal rate.

Figure 9:
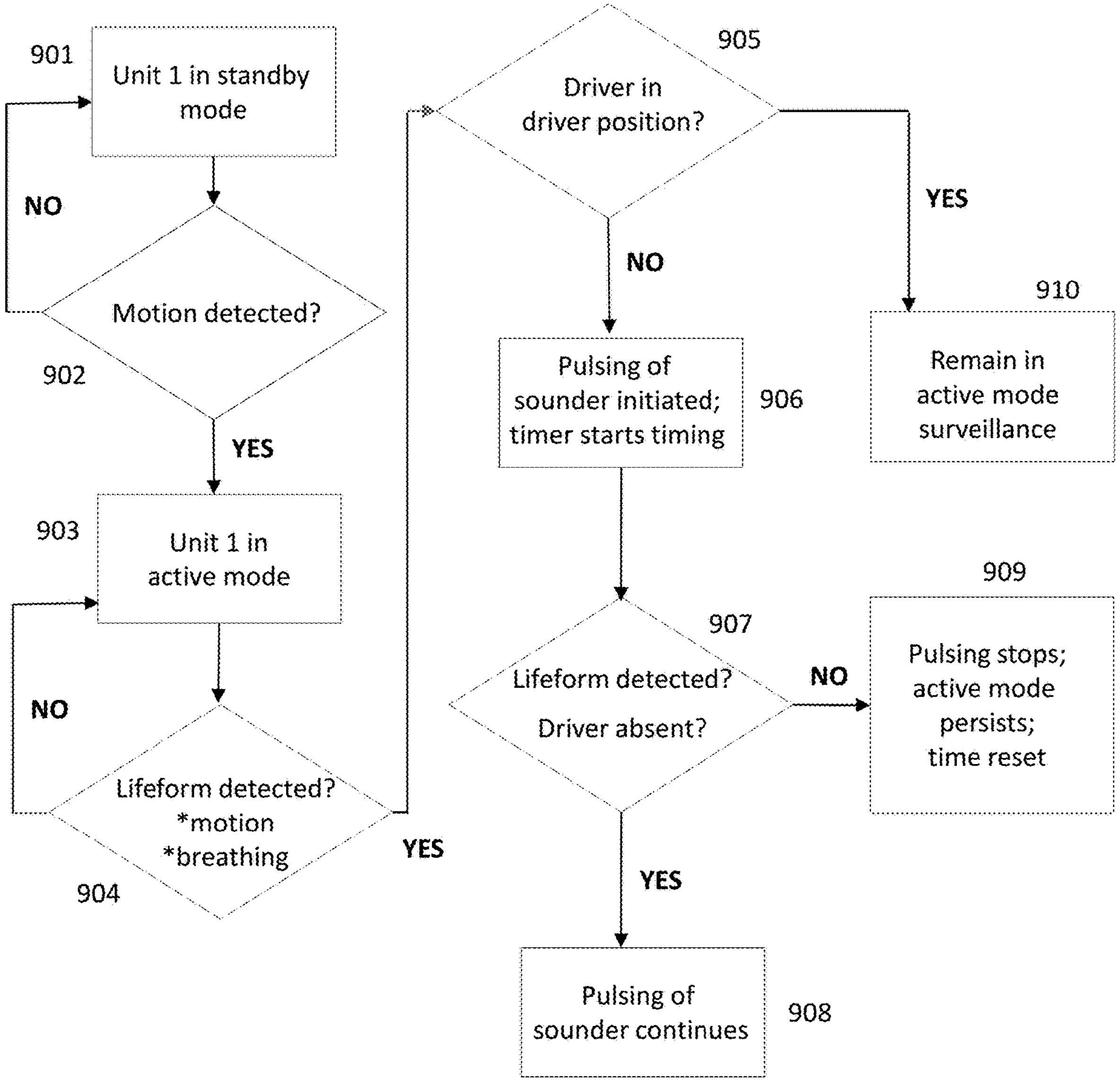
FIG. 9 is a flow diagram showing a sequence of steps that would trigger a first-level response.

FIG. 9 is an embodiment of method flow steps for status determination and first-level alarm response. As shown, starting from a standby mode (901), unit 1 will change to active mode (903_when a door is opened, 902 (e.g. motion detected). In active mode, unit 1 senses first for child presence or absence. Then, it senses for driver presence or absence. If both child and driver are present, unit 1 remains in active mode but invokes no alarm response (904). If driver is present, and in driving position, unit 1 stays in active mode surveillance (910). If child is present and driver is absent as detected in step 905, unit 1 starts a timer and invokes a first-level alarm response whereby it sends, wirelessly, a series of pulses to unit 2 (906) while continuing to assess child/driver status (907). If child present/driver absent status persists, the repetitive sound pulsing will persist (908). If during the predetermined time duration the status changes to child absent, or driver present, or both child and driver absent, unit 1 will cease the first-level alarm response, return to active-mode surveillance, and reset the time (909).

Figure 10:
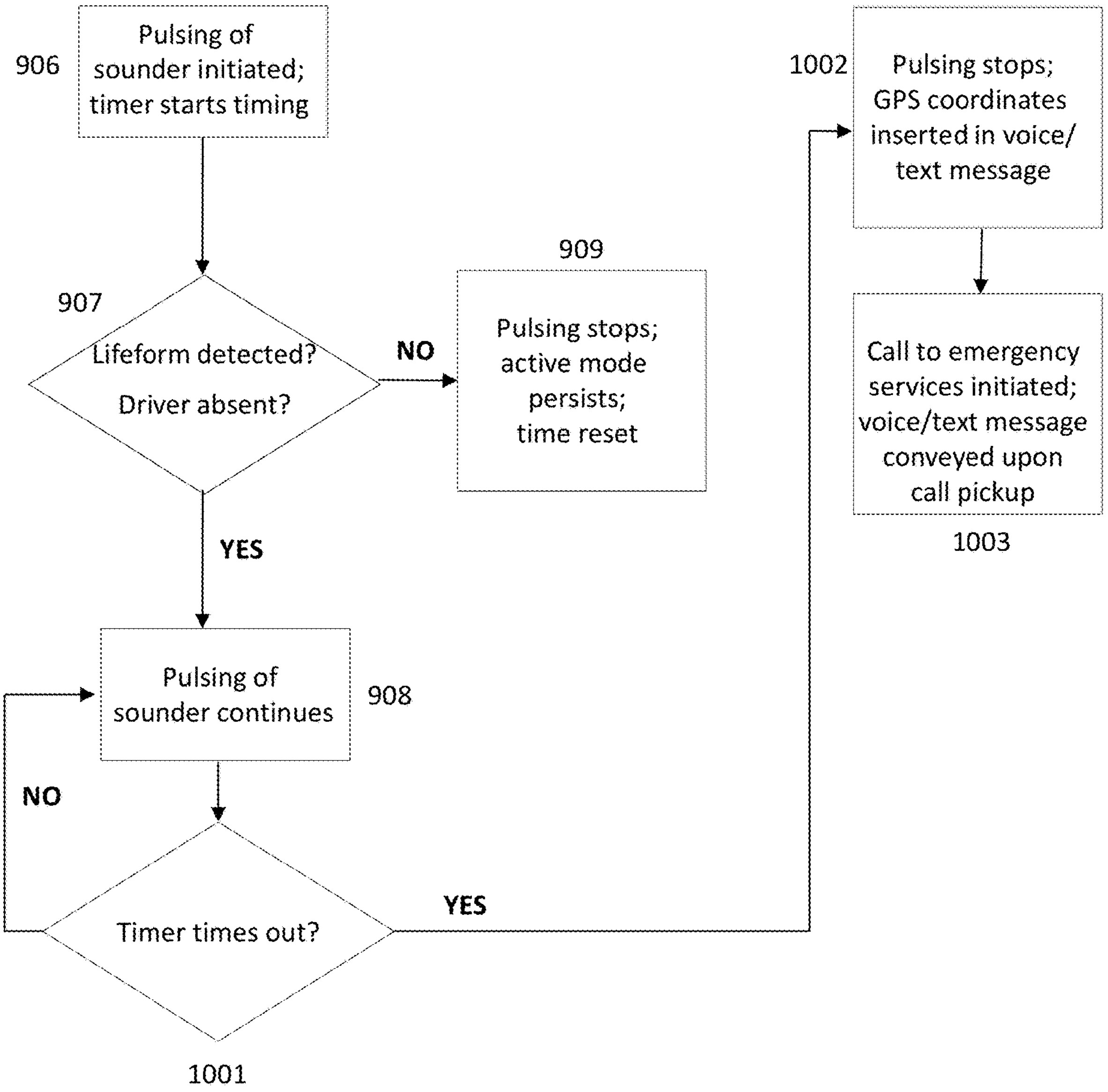
FIG. 10 is a flow diagram showing a sequence of steps that would trigger a higher-level response.

FIG. 10 is an embodiment of method flow steps wherein a first-alarm response persists and the predetermined time duration has been exceeded (906, 907, 908, and 1001). Shortly after time duration has elapsed, GPS coordinates are appended to a text/voice message prepared by unit 1 which comprises vehicle description, location and situational description (1002). This message is then conveyed, via cellular phone call, to emergency services (1003).

The PVH safety system must operate dependably. Like a house smoke alarm, unit 1 has its own, self-contained, power source. Just as a house smoke alarm will periodically beep when battery level falls below a predetermined value, the PVH safety system, in standby mode, periodically measures its battery voltage. If battery voltage falls below a predetermined level, unit 1 will periodically pulse a piezo-electric transducer to let users know the system cannot be relied upon until the battery is replaced. Similarly, unit 1, during standby mode, will be programmed to periodically change to active mode and self-test all subsystems and functions. Again, if any subsystem fails to pass the self-test, unit 1 will begin periodically pulsing the piezo-electric transducer to alert the user that the unit cannot be depended upon until serviced or replaced.

Figure 11:
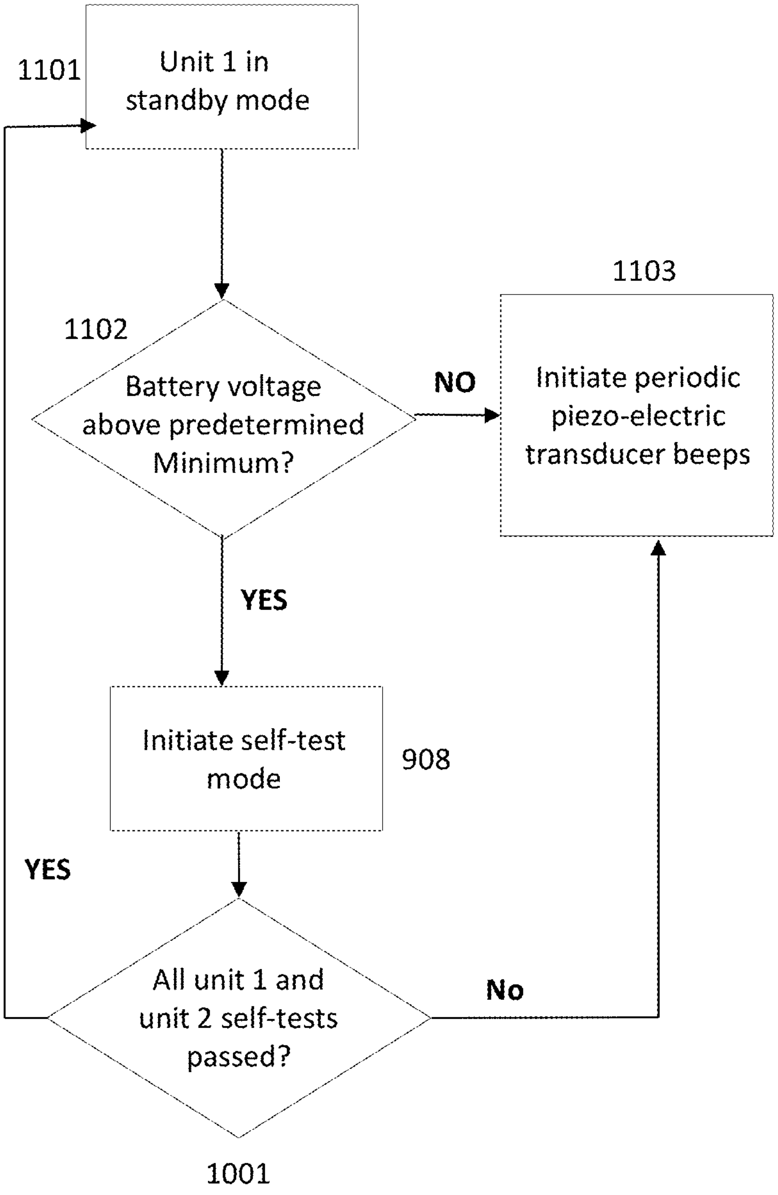
FIG. 11 illustrates an embodiment wherein battery level is checked by unit 1, first, and all subsystem functions are checked by unit 1, next.

FIG. 11 is an embodiment of the self-testing mode that ensures that a user will be alerted if a unit 1 battery is below a safe limit, and if any of the subsystems and functions fail to pass a programmed test. For example, as shown, while in standby mode (1101), the unit 1 will periodically check battery voltage level to determine if it is above a predetermined lower limit (1102). If it does not pass that test, the unit initiates piezo-electric beeping (1103). If battery level is above the predetermined lower limit, the unit will switch to active mode and conduct a programmed series of short tests to determine if the sensors, communications subsystems, GPS, and so on, are all operating properly. In the event that one subsystem or subsystem function fails to pass a test, unit 1 will again initiate piezo-electric warning sounds. If battery level and subsystem functions are operating properly, the unit 1 system will revert to standby mode.

The enclosures and components used in units 1 and 2 must be capable of operating up to 150 degrees Fahrenheit to ensure that even under worst-case temperature levels, the system will operate as intended. The units are not described as to enclosure size and shape because these are non-critical parameters. Sensors have been tested that will detect breathing motion of a sleeping infant covered by a blanket. Similarly, sensors have been tested that can detect a rise in $CO_2$-levels, in a vehicle cabin, within a few minutes. Mounting of unit 1 on a vehicle's ceiling can be done using double-sided tape or double-sided hook-and-loop fixtures. Mounting of unit 2 in the engine compartment can be done using a strong magnetic on the enclosure allowing it to be affixed to a metallic surface in proximity to the vehicle's battery.

The invention claimed is:

1. What is claimed is a safety system for children left unattended in vehicles comprising:
- a unit 1, inside-a-vehicle, subsystem comprising:
  - a motion detection sensor;
  - a carbon-dioxide sensor,
  - an electronic camera;
  - a GPS subsystem;
  - a microcontroller subsystem;
  - at least one control program;
  - a first wireless communications subsystem;
  - a cellular communications subsystem;
  - at least one battery;
  - a piezo electric transducer; and
  - an enclosure with at least one aperture
- a unit 2, under-hood, subsystem comprising:
  - a second wireless communications subsystem;
  - a digital-to-analog converter;
  - an audible-sound transducer; and
  - an enclosure operative to magnetically attach to a metal surface in an engine compartment.

2. A system as in claim 1 wherein:
the motion detection sensor is operative to detect the opening and closing of any vehicle door and motion inside a vehicle.

3. A system as in claim 1 wherein:
the carbon-dioxide sensor is operative to detect carbon dioxide levels inside a closed vehicle.

4. A claim as in claim 1 wherein:
the electronic camera is aimed at a driver position via reflection in a rear-view mirror through an aperture in the unit 1 subsystem's enclosure.

5. A claim as in claim 1 wherein:
the GPS subsystem is operative to detect and report current location coordinates to the microprocessor subsystem.

6. A claim as in claim 1 wherein:
- the microcontroller comprises:
  - a central processor;
  - a non-volatile program memory;
  - a random-access data memory;
  - an input-output subsystem;
  - a digital-to-analog converter;
  - an analog-to-digital converter; and
  - electronic timer
- the non-volatile program memory stores at least one program operative to control:
  - sensing of motion and $CO_2$-levels;
  - determining child/driver presence or absence status;
  - setting and resetting a timer;
  - comparing a timer elapsed time against a predetermined time limit;
  - responding with a first-level alarm process;
  - responding with a second-level alarm process;
  - testing by unit 1 of subsystem functions;
  - transitioning from standby to active mode and vice-versa;
  - preparing of a text/voice message;
  - initiating wireless communications; and
  - initiating cellular call placement and message conveyance.

7. A claim as in claim 1 wherein:

wireless communication subsystem 1 conveys a wireless signal from the unit 1 subsystem to the unit 2 wireless communication subsystem 2.

8. A claim as in claim 7 wherein:

the wireless signal evokes an audible sound from the audio-sound transducer located inside the unit 2 subsystem.

9. A claim as in claim 1 wherein:

the cellular communications subsystem is operative to engage with a cellular infrastructure and place at least one call to a predetermined phone number.

10. A method of use comprising:

using a motion-detection sensor to detect a door-open motion;

changing operational state from standby to active mode operation;

using the motion-detection sensor to detect motion inside the vehicle;

using a carbon-dioxide detector to detect carbon-dioxide levels inside the vehicle; and using an electronic camera aimed at a rear-view mirror and driver-seat position to detect the presence or absence of a driver in the driver's seat;

starting a timer if:

motion detected in vehicle; and no driver detected in driver's seat;

sending wireless prompt signals from an inside-a-vehicle subsystem to an under-the-hood subsystem; and responding, by the under-the-hood subsystem, to the wireless prompt signals by pulsing an audio-sound transducer each time a signal is received.

11. A method as in claim 10 wherein:

the wireless prompt signals are sent in 0.5 second intervals.

12. A method as in claim 11 wherein:

the wireless signals continue to be sent unless a driver present, or child absent, condition is detected.

13. A method as in claim 10 further comprising:

using the timer to determine if a predefined time interval has elapsed;

preparing a text and simulated voice message wherein message comprises:

description of vehicle;

description of situation; and

GPS coordinates, making a cellular call to an emergency-services number;

conveying the text and simulated voice message when call is answered; and repeating the text and simulated voice message until call is disconnected.

* * * * *